Nov. 17, 1925.

W. F. BUTLER 1,562,289

MACHINE FOR POSITIONING AND CUTTING FISH

Filed Dec. 30, 1920     6 Sheets-Sheet 1

INVENTOR
Wm. F. Butler.
BY H. N. Low
ATTORNEY

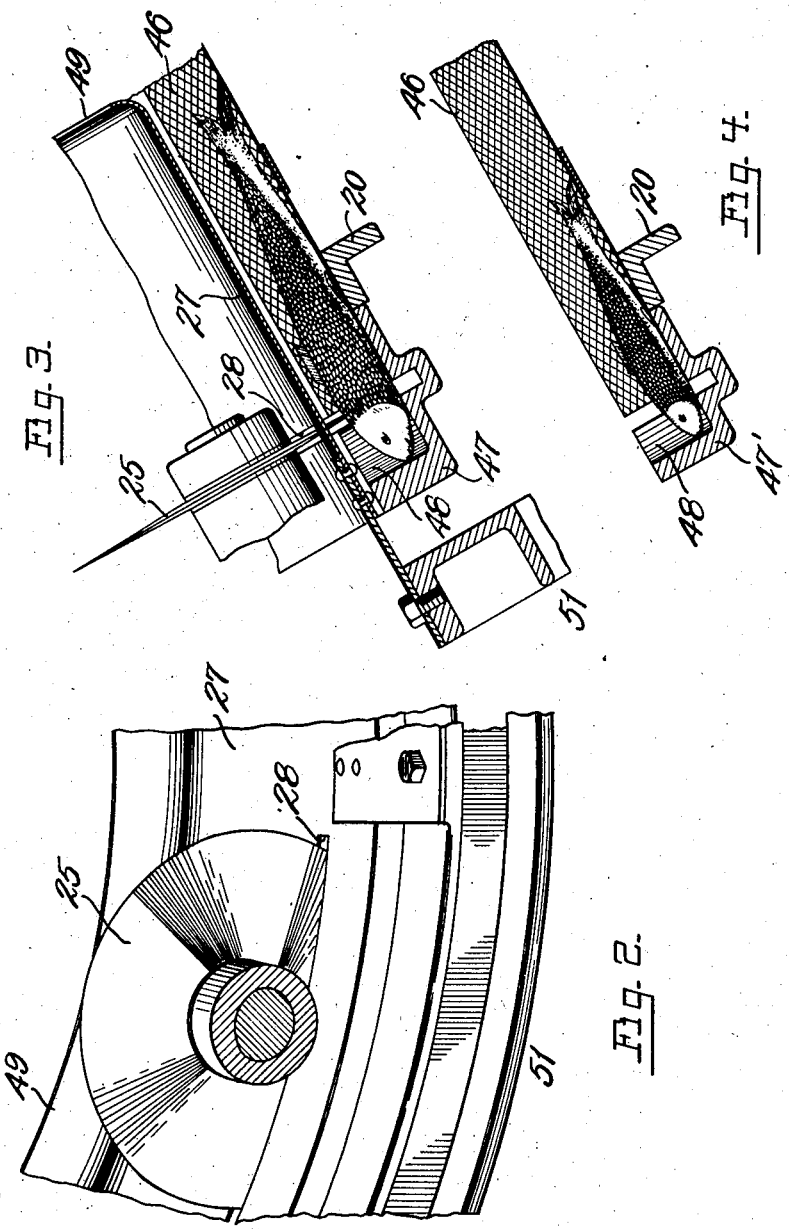

Nov. 17, 1925.

W. F. BUTLER 1,562,289

MACHINE FOR POSITIONING AND CUTTING FISH

Filed Dec. 30, 1920     6 Sheets-Sheet 3

INVENTOR
Wm. F. Butler
BY
ATTORNEY

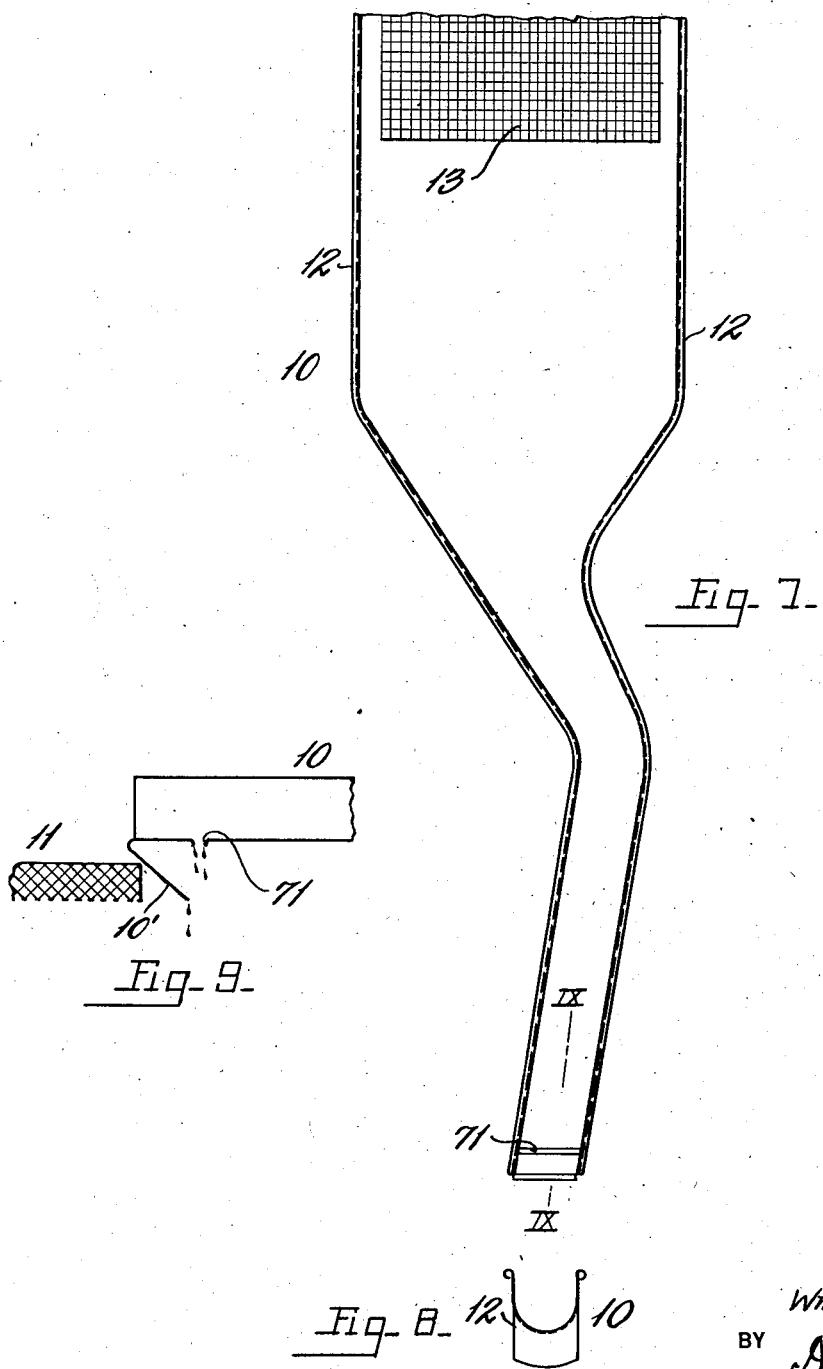

Nov. 17, 1925.
W. F. BUTLER
1,562,289
MACHINE FOR POSITIONING AND CUTTING FISH
Filed Dec. 30, 1920      6 Sheets-Sheet 5
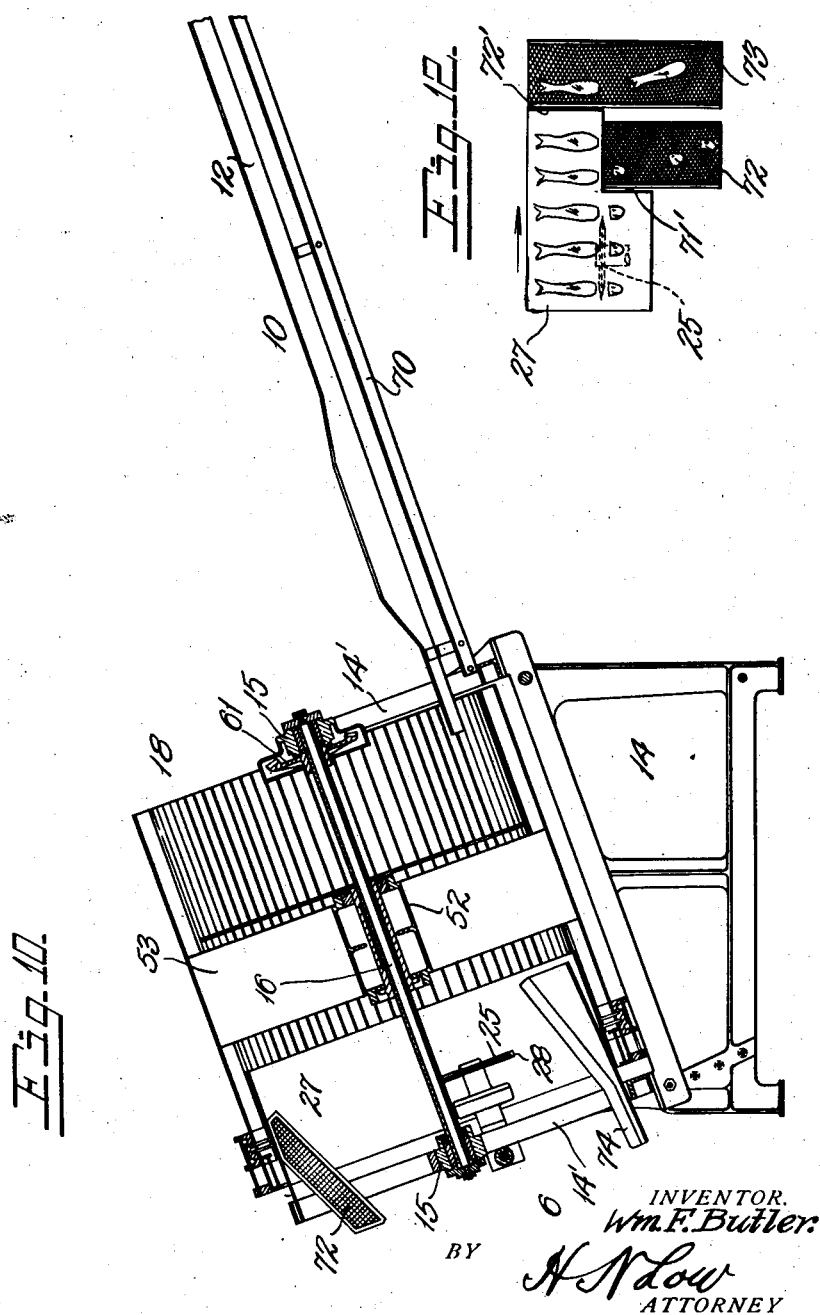

Nov. 17, 1925.

W. F. BUTLER 1,562,289

MACHINE FOR POSITIONING AND CUTTING FISH

Filed Dec. 30, 1920    6 Sheets-Sheet 6

INVENTOR.
Wm. F. Butler.
BY N N Low
ATTORNEY

Patented Nov. 17, 1925.

1,562,289

UNITED STATES PATENT OFFICE.

WILLIAM F. BUTLER, OF HILLSIDE, NEW JERSEY, ASSIGNOR TO AMERICAN CAN COMPANY, OF NEW YORK, N. Y., A CORPORATION OF NEW JERSEY.

MACHINE FOR POSITIONING AND CUTTING FISH.

Application filed December 30, 1920. Serial No. 434,084.

*To all whom it may concern:*

Be it known that I, WILLIAM F. BUTLER, a citizen of the United States, residing at Hillside, in the county of Union and State of New Jersey, have invented certain new and useful Improvements in a Machine for Positioning and Cutting Fish, of which the following is a specification.

The invention relates to an improved apparatus for positioning fish for the purpose of cutting off their heads, or for the uniform arrangement of them for packing, or for the performance of other useful operations which it may be desired to perform. The fish as ordinarily received or deposited in bulk are in a mass in which the fish are mixed and lie in all conceivable positions. By my improvements they are inexpensively and rapidly sorted out automatically and caused to lie all with their heads in the same direction. If it be desired to cut off their heads at this time such operation may be performed without any additional delay in the operation, as they are, or may readily be, arrested with their heads all in uniform arrangement with respect to the decapitating knife, and my apparatus herein illustrated comprises such decapitating means.

With such objects in view, the invention consists in the parts and combinations thereof hereinafter set forth and claimed, with the understanding that the several necessary elements constituting the same may be varied in proportions and arrangement without departing from the nature and scope of the invention.

In order to make the invention more clearly understood there are shown in the accompanying drawings means for carrying the same into practical effect, without limiting the improvements, in their useful applications, to the particular constructions which, for the purpose of explanation, have been made the subject of illustration. In the said drawings:—

Fig. 2 is a perspective view showing the decapitating knife and contiguous parts near the delivery end of the machine.

Fig. 3 is a vertical sectional view of said part of the machine, showing a fish arranged for decapitation.

Fig. 4 is a similar view showing a smaller gauging device substituted in the machine for operation upon fish of smaller size.

Fig. 7 is a plan view of the lower portion of the fish positioning chute which leads to the interior of the drum for the delivery of the fish head first to the latter.

Fig. 8 is an end view of the lower end of said chute.

Fig. 9 is a longitudinal sectional view of the same on line IX—IX of Fig. 7.

Fig. 10 is a longitudinal central sectional view including the drum and a portion of the positioning slide or chute.

Fig. 12 is a diagram in plan view to illustrate the delivery of the heads and bodies of the fish into their respective chutes.

Figure 1:
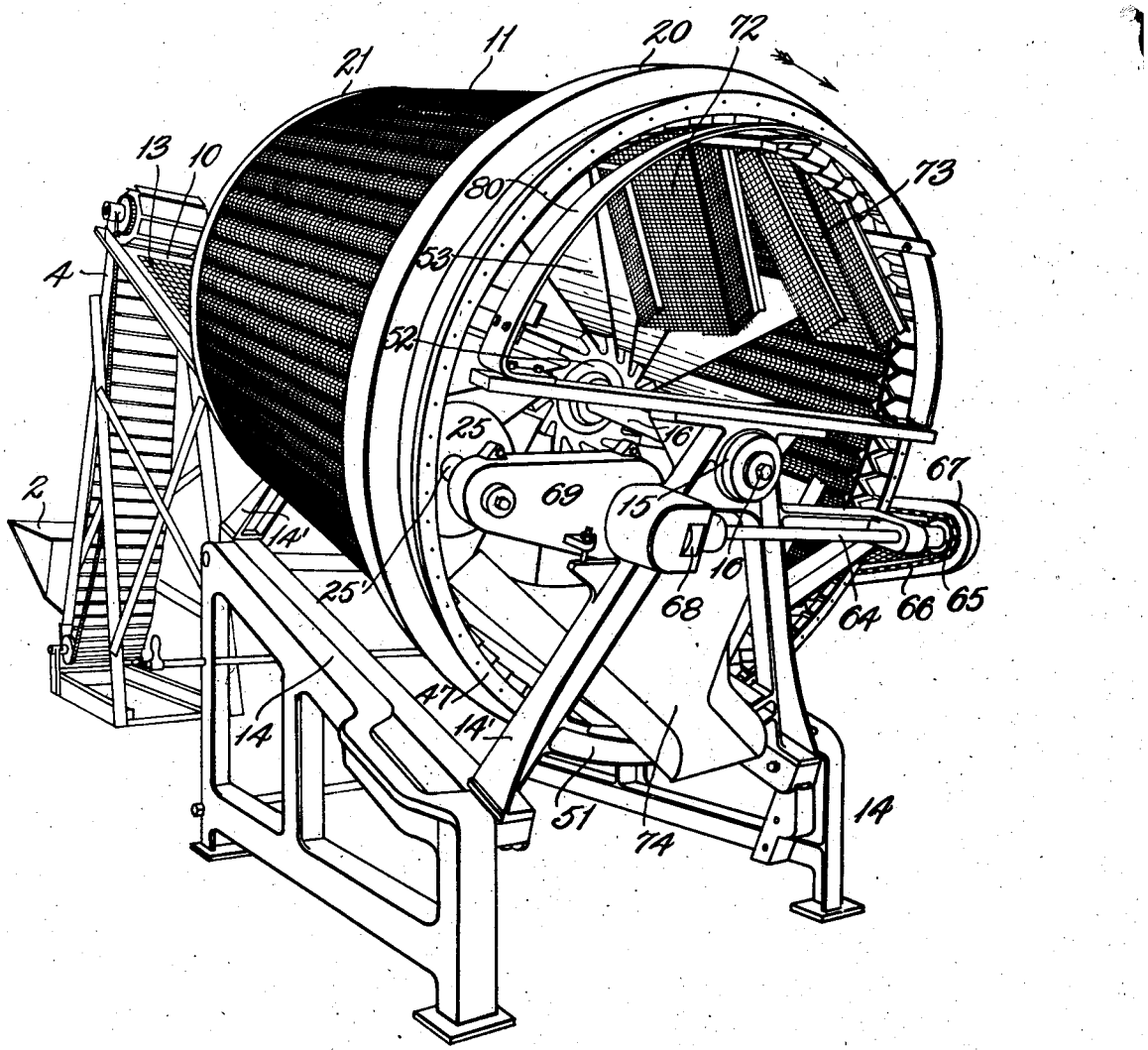
Fig. 1 is a perspective view of a fish elevating, positioning and decapitating machine embodying the invention, looking toward the delivery end of the machine.

Referring to the drawings 4 is an elevating conveyor actuated by suitable means presently to be described, and of any preferred form, and which may receive the fish which have been dumped into a hopper 2. Preferably such fish have been more or less graded according to size, if necessary.

As the fish fall from the conveyor 4 they fall in positions parallel with each other and transverse to the line of advance; some with their heads pointing to the right and others with their heads pointing oppositely as may happen, on the surface of a forwardly and downwardly inclined slide 10. This slide has such suitable inclination as will cause the fish to slide downwardly and forwardly into a constantly revolving drum 11. The friction of the fish on the top surface of the positioning slide 10 causes them all to turn with their heads downward and forward, so each fish enters the drum 11 head first. This turning of the fish may be said to be due either to the retarding of their tails or the greater weight of the head portions or to the resistance of the fins and scales against allowing the fish to slide tail first, but perhaps more or less to all of these causes.

It will be understood that water may be supplied to the slide 10 for the purpose of keeping it and the fish slippery, but this may not be an essential part of the apparatus and is to be employed or not as may be advisable. The slide 10 may be provided with a bottom surface of mesh wire 13 to give a slight resistance to the sliding of the fish and aid in compelling them to turn as above mentioned. The part of the apparatus above described may be more or less similar to that set forth in my Patent No. 1,247,502 dated Nov. 20, 1917.

As illustrated the slide 10 is shown supported in its inclined position by parallel angle irons 70 and as best shown in Fig. 7 the lower or delivery end of said slide is of crooked or irregular configuration its sideboards 12 constituting means for deflecting the fish laterally. The purpose of this construction of the slide is to retard the movement of the fish in their progress toward the drum and to promote and give time for their turning as desired, and tends to prevent them from rushing into the drum, and in the event that they become bunched this construction has the tendency to separate them and cause them to slide down in such arrangement that each fish will enter the channels of the drum 11 without any obstruction from any of the other fish passing into said channels. The extreme lower end of this slide is provided with a transverse slot or opening 71 which constitutes an outlet for the water which would otherwise enter into the flutes of the drum 11 (Figs. 7 and 9). The water may also be deflected by an apron 10'. The upper ends of the bars 70 may be supported by the elevator frame and the lower ends by the drum supporting frame (Fig. 11), and provision is made for adjusting the inclination of the slide by a slotted bracket 75 which carries the lower end of the slide and is adjustably mounted on the bars 70 by bolts 76 which pass through the slots of the bracket.

Figure 5:
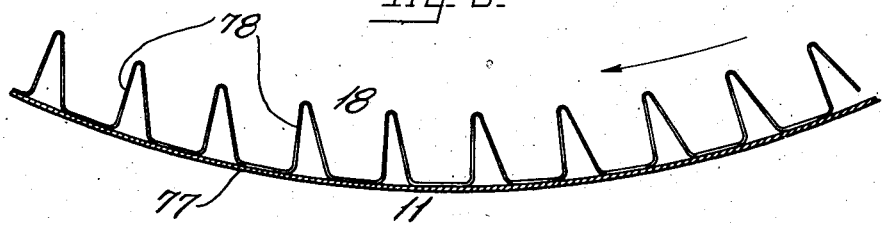
Fig. 5 is a substantially vertical transverse section of the lower part of the drum on line V—V of Fig. 6.
Figure 6:
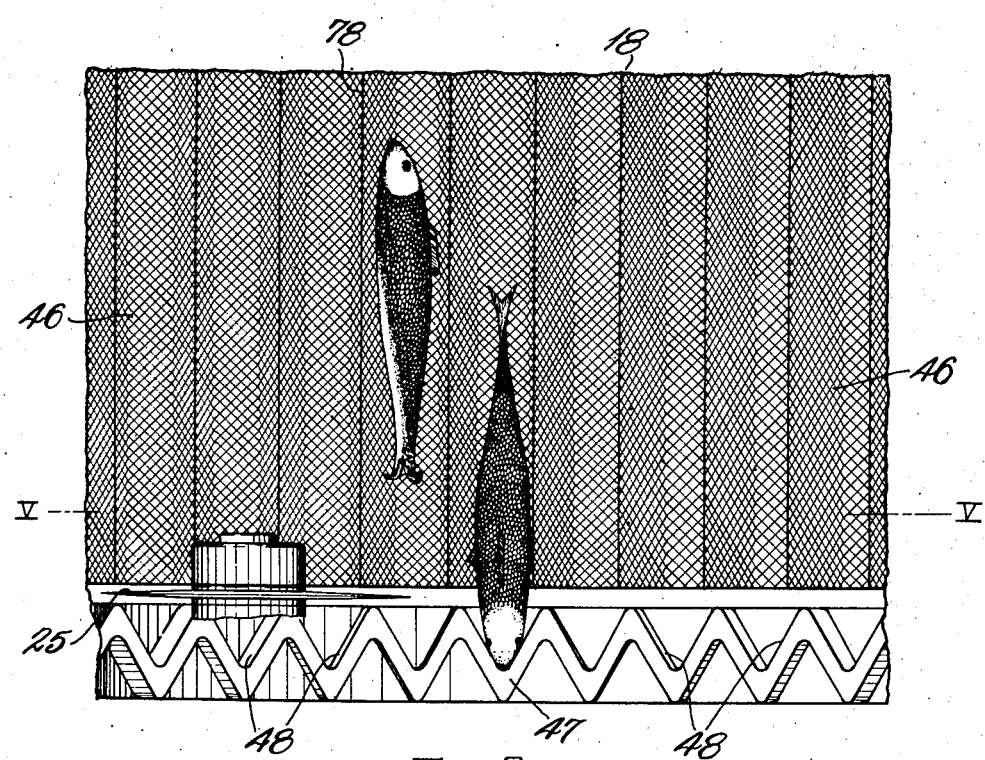
Fig. 6 is a plan view of a portion of the lower or delivery end of the drum.
Figure 11:
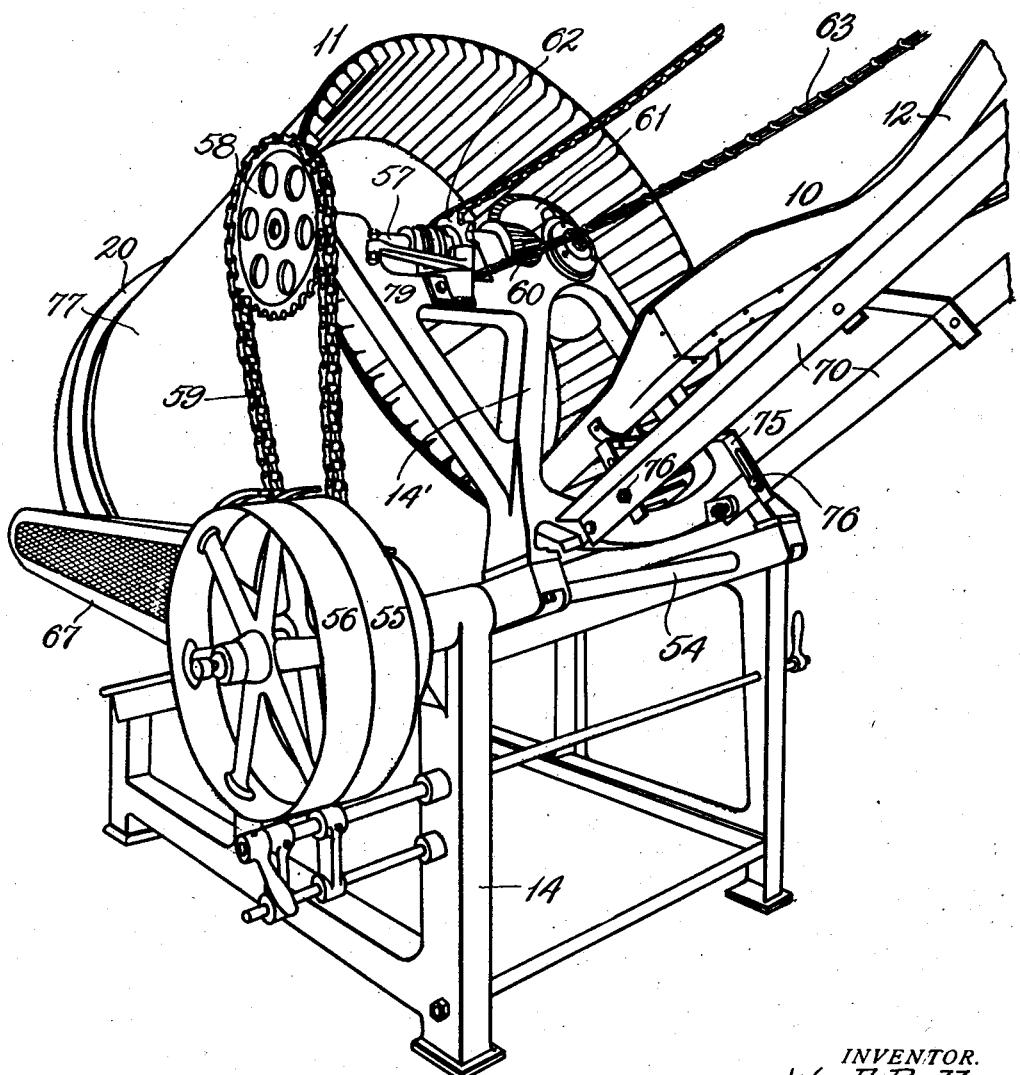
Fig. 11 is a perspective view looking toward the receiving end of the drum and showing a portion of said slide.

14 is a frame having an inclined top carrying standards 14' which incline toward the axis of the drum and on which are fixed bearings 15 in which is journaled a downwardly and forwardly inclined shaft 16, on which the drum 11 is mounted in its inclined position. The drum is shown as formed with fish-guiding means, such for instance as a cylindrical corrugated or channeled wall 18 of wire mesh or other suitable material attached to external rings 20 and 21. In Figs. 5 and 11 the drum is shown as comprising an external sheet metal shell 77. The fish supporting elements 78 of the channels are preferably not radial but are inclined in the direction of rotation of the drum, as seen in Fig. 5. Each of the channels on the drum wall 18 is of sufficient size to receive one or more fish as they leave the slide 10. It will be understood that the channels pass successively across the paths of the fish as they leave the slide and the number of fish received in each channel may be varied according to different conditions, such as the size of the fish and the frequency with which they are fed from the elevating conveyor as compared with the speed of rotation of the drum; it being desirable not to have more fish in any channel than the same is wide enough to conveniently hold, which result can be attained by suitably regulating the speeds of the said parts. The fish quickly arrive at the lower end of the drum and they are stopped uniformly by a removable gauge 47 attached to and turning with the drum or fish carrier (Figs. 3, 4 and 6). When so stopped their heads project a little beyond the lower end of the drum and the rear line of their gills is substantially in line with a rotary cutter or knife 25, against the edge of which the fish are successively carried by the rotation of the drum, so that their heads will all be cut off at the desired plane. While the fish are thus at the lower end of the drum and approaching the cutter they are confined by a plate 27 which is attached to fixed frame elements 51, 80 (Fig. 1) and extends up to or near the top of the drum, said plate 27 being provided with a space 28 in which the cutter 25 works. An advantage of this arrangement is that when the fish are small and pliable their bodies may not be bent by the friction of their noses against a fixed gauge, which would result in their being improperly cut or mutilated. When such gauges 47 are used I may have several of them of different lengths, adapted to be substituted one for another and attached to the drum for different prevailing sizes of fish. The gauge of proper size will be attached to the drum before beginning operations. In Fig. 4 is illustrated a gauge 47' shorter from the line of the knife than that illustrated in Fig. 3, and adapted for smaller fish. Figs. 3, 4 and 6 also illustrate another useful feature which may be employed in the gauge, consisting of tapering sockets 48 to receive and firmly center the nose of the fish, as best illustrated in Fig. 6, these sockets being preferably cast on the gauge. Also the confining plate 27 may have an upturned rear edge 49 (Figs. 2 and 3) to direct the fish beneath it and prevent chance of arresting a fish larger than the average.

These figures also illustrate means for arresting any fish before it gets in line with the knife, in case the fish has by accident entered the drum tail first, such means consisting as aforesaid of a wire netting of which the channels of the drum, or the lower ends of the same, are formed. A fish sliding head first will freely pass over this netting into proper position to be decapitated, as shown in Figs. 3, 4 and 6. If a fish should slide tail-first to or into the netting corrugations its tail or body fins will catch in the interstices of the wire (Fig. 6) before getting in line with the knife, and it will be carried up and delivered in an unmutilated condition, and may be again fed to the slide and drum.

The drum is typical of any equivalent inclined and movable surface having means for holding the fish alined side by side, parallel with each other, with their heads in the same direction, and such a surface or carrier may be of various forms and arrangements without departing from the invention.

The elevator 4 has or may have its flights of such width and length that each will pack up and carry one fish, and the moving corrugated surface may be correspondingly timed so that one fish will occupy each corrugation against the gauge 47.

Fixed to the shaft 16 is a spider 52 from which radiate a plurality of partition plates 53 which serve to reinforce the drum 11 and support it on the shaft 16, (Figs. 1 and 10). Means for rotating the drum consist of a power shaft 54 journaled in the frame 14. On this shaft are fixed and idler pulleys 55 and 56 which may be belt driven from any suitable source such as a line shaft (not shown). Carried by an extension 79 of the standard frame 14' at the receiving end of the drum is a transverse countershaft 57 to which power is supplied from the shaft 54 by sprocket wheels 58 and sprocket chain 59. A bevel pinion 60 on the counter shaft 57 meshes with and rotates a bevel gear 61 fast on the shaft 16 on which the drum is mounted. By means of sprocket wheels 62 and chain 63 power is supplied to the elevating conveyor 4. Means for rotating the decapitating knife are afforded by a shaft 64 to which power is supplied from the shaft 54 through sprocket wheels 65 and chain 66 enclosed in a protective casing 67. A bevel pinion 68 on the end of shaft 64 drives a bevel wheel on a stub shaft and this power is transmitted to the shaft 25', on which the knife is mounted, by means of sprocket wheels and a chain which are enclosed in a protective housing 69.

After the fish have been decapitated both the bodies and severed heads are carried by the revolving drum around beneath and then over the guide plate 27 to points substantially at the top of said drum where said guide plate is partially cut away at 71' (Fig. 12) to allow said fish heads to drop into a trough 72 from which they are conveyed to any suitable receptacle. At a point beyond the trough 72 the guide plate 27 terminates at 72' and the fish bodies are allowed to fall by gravity into a second inclined trough 73 from which said bodies may be conveyed to any desired point. The troughs or chutes 72 and 73 may be of wire mesh to allow any water to drain away, and to facilitate the cleaning of the machine. Should any fish fail to reach the gauge 47 at the lower end of the drum and consequently fail to be carried beneath the plate 27 to the decapitating knife 25 they will fall by gravity into the spaces between the revolving partition plates 53 and from thence, by reason of the inclination of the drum, on to a trough 74 fixedly carried at the lower end of the drum 14 in a position to receive said fish, and from said trough the fish may be removed and returned to the hopper 2 so as to again enter the machine.

An advantage of constructing the drum with the shell 77 is that any water may be collected by it and delivered at its lower end to be conducted away in a convenient manner. Whether or not said shell is employed water will drain through the wire mesh channels and prevent any water from running or accumulating therein.

What is claimed is—

1. In a machine for positioning fish, the combination with a delivery chute of a rotary drum cooperating therewith having a reticulated portion provided with a plurality of channels adapted to receive the fish delivered thereto from said chute.

2. In a machine for positioning and cutting fish the combination of a delivery chute, a rotary drum cooperating therewith, and a cutting mechanism associated with said drum, said chute being provided with means for deflecting fish laterally to aid them in turning for delivery to said drum head foremost, and said drum being provided with a plurality of reticulated channels adapted to successively receive the fish delivered thereto from said chute and to retard the passage of fish which may be delivered to the drum in a tail foremost position to prevent the fish thus positioned from being delivered to said cutting means.

3. An inclined fish-positioning slide for fish-handling machines, having a relatively wide upper portion whereon the fish may turn, and narrowing toward the lower delivery end and having a sinuous formation above the delivery end to retard, distribute and turn the fish.

4. An inclined fish-positioning slide for fish-handling machines, having a relatively wide upper portion whereon the fish may turn, and narrowing toward the lower delivery end and having a sinuous formation to retard, distribute and turn the fish, the bottom of the delivery portion being concave to center the positioned fish on a line of delivery.

5. In a machine for positioning fish, in combination: an inclined positioning slide, a rotary drum having an interior inclined surface provided with fish-guiding means, means for deflecting the fish laterally on said slide to aid them in turning and be delivered head foremost to said drum, means for alining said fish while in said drum, cutting means within said drum and means for turning the drum and carrying the alined fish within said drum to the cutting means.

6. In a machine for positioning fish, in combination: an inclined positioning slide, a rotary drum having an interior inclined surface provided with fish-guiding means, said slide having a sinuous course for deflecting the fish laterally on said slide to aid them in turning and be delivered head foremost to said drum, means for alining said fish while in said drum, cutting means cooperating with said drum, and means for turning the drum and carrying the alined fish within said drum to the cutting means.

7. In a machine for positioning fish, in combination: an inclined positioning slide, a rotary drum having an interior inclined surface provided with fish-guiding means, sinuous means for deflecting the fish laterally on said slide to aid them in turning and be delivered head foremost to said drum, means for adjusting the lower end of the slide relative to the drum, means for alining said fish while in said drum, cutting means within said drum, and means for turning the drum and carrying the alined fish within said drum to the cutting means.

8. In a machine for positioning fish, in combination: reticulated conveying means for carrying the fish laterally, a cutter to which the fish are so carried, means moving with the conveyor for alining the fish, and means for centering and confining the heads of the fish during decapitation.

9. In a machine for cutting fish, the combination of cutting means and an inclined rotary drum comprising a shell having on its interior wire mesh extending inwardly and outwardly and forming fish guiding channels.

10. In a machine for cutting fish, in combination: a rotary drum having an interior inclined surface provided with a wire mesh corrugated to form fish guiding channels, decapitating means, and mechanism for rotating the drum to move the channels relative to the decapitating means.

11. In a machine for positioning fish, in combination: an inclined fish-positioning slide, a rotary drum having an interior inclined surface provided with fish-guiding means, and means carried by said slide to prevent the entry of water from said slide to said drum.

12. In a machine for positioning fish, in combination: an inclined slide, a rotary drum having an interior inclined surface provided with fish-guiding means to which the fish are delivered head foremost from said slide, a gauge for alining said fish while in said drum, and cutting means to decapitate said fish, said drum having means to prevent the passage of water to said gauge plate.

13. In a machine for positioning fish, in combination: an inclined slide, a rotary drum having an interior inclined surface provided with fish-guiding means, means for deflecting the fish laterally on said chute to aid them in turning and be delivered head foremost to said drum, means for alining said fish while in said drum, said means including a gauge plate of zig-zag configuration to rigidly hold the heads of said fish, cutting means within the drum to decapitate said fish, and means within said drum to prevent the passage of water to said gauge plate.

14. In a machine for positioning fish; in combination: an inclined fish-positioning slide, a rotary drum having an interior inclined surface provided with fish-guiding means to which the fish are delivered head foremost from said slide, a wire mesh within said drum to arrest any fish delivered tail foremost from said slide, and means for collecting and delivering outside of the drum such arrested and uncut fish.

15. In a machine for positioning fish, in combination: an inclined fish-positioning slide, a rotary drum having an interior inclined surface provided with fish-guiding means, means for deflecting the fish laterally on said slide to aid them in turning and be delivered head foremost to said drum, means for alining said fish within said drum, cutting means, said drum having means to arrest any fish delivered tail foremost from said slide, and means for collecting such uncut fish and conducting them outside of the drum.

In testimony whereof I affix my signature.

WILLIAM F. BUTLER.